UNITED STATES PATENT OFFICE.

ERNST TWITCHELL, OF CINCINNATI, OHIO.

FATTY AROMATIC SULFO COMPOUND AND PROCESS OF MAKING SAME.

SPECIFICATION forming part of Letters Patent No. 628,503, dated July 11, 1899.

Application filed February 10, 1898. Serial No. 669,799. (Specimens.)

*To all whom it may concern:*

Be it known that I, ERNST TWITCHELL, residing at Cincinnati, in the county of Hamilton and State of Ohio, have invented a certain new and useful Sulfo Fatty Aromatic Compound and Process of Producing Same, of which the following is a specification.

The object of my invention is to produce a chemical compound which is formed by the action of sulfuric acid upon a mixture of a member of the oleic-acid series or a compound thereof and a member of the aromatic series, the result of which reaction is a union of the sulfonic radical with the member of the oleic-acid series and the member of the aromatic series in certain definite molecular proportions.

It is well known that the sulfo-fatty acids which are largely used in the arts are somewhat unstable compounds, and that for this reason in the production of the same by treating with sulfuric acid a fatty acid or oil the yield or percentage of the sulfo-fatty acid is small in comparison with the reagents employed, and that a consequent large per cent. of the reagents are wasted and the unstable product itself is easily decomposed and separated into its component parts. My invention is directed to overcome this objection by producing a reagent which will accomplish the functions of the sulfo-fatty compound and which is stable under all ordinary circumstances, can be simply produced, and with a much less waste of the reagents employed.

The preferred method of preparing this compound is as follows: I have found the oleic-acid series best adapted to my purposes, and the oleic acid of commerce is mixed with about forty per cent. of its weight with a body of the aromatic series—such as naphthalene, benzene, phenol, &c.—and then adding concentrated sulfuric acid, preferably in excess. After standing awhile water is added and the excess of sulfuric acid is washed out and the resultant compound deposits on top in the form of a clear oil, which can be readily removed for use.

I have found that this compound is a distinct chemical compound and believe it to be entirely new, as I have never before known of a double compound of the sulfonic radical with oleic acid and an aromatic body, and I have termed this new compound a "sulfo-oleic aromatic compound." I prefer to mix the fatty acids or oil and the bodies of the aromatic series substantially in the proportions of their molecular weights, as the production of the compound when the mixture is treated to the action of the sulfuric acid will then be more complete.

I have found that when concentrated sulfuric acid in excess acts on a mixture of oleic acid and benzene at a temperature below 30° centigrade a double sulfonic acid is formed, according to the following equation:

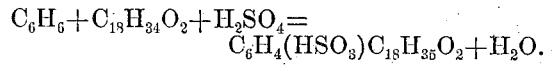

$$C_6H_6 + C_{18}H_{34}O_2 + H_2SO_4 = C_6H_4(HSO_3)C_{18}H_{35}O_2 + H_2O.$$

Benzene plus oleic acid and sulfuric acid equals the new sulfonic acid and water. The new compounds formed by this reaction may be termed generally "sulfo-fatty-aromatic compounds;" but in the case of the equation given it is properly a sulfo-benzene-stearic acid or benzene-stearo-sulfonic acid, the technical name differing according to the member of the aromatic series employed. This new compound obtained in this way is contaminated with small quantities of, first, unacted-on oleic acid and other fatty matter; second, unacted-on benzene; third, sulfo-fatty acids; fourth, benzol sulfonic acid; fifth, sulfuric acid in large quantities.

To purify the compound for chemical investigation, I treat the product of the reaction with water and heat to boiling, whereby the excess of sulfuric acid is diluted and the mass separates into two layers. The lower—a clear aqueous layer—contains the excess of sulfuric acid and whatever benzene sulfonic acid may have been produced, (for this latter compound is soluble in dilute sulfuric acid, while the new sulfo-fatty-aromatic compound is not.) The upper layer—a viscous oil—contains the sulfo-benzene-stearic acid with the remaining impurities. The lower layer is removed and the upper layer is repeatedly washed with water containing hydrochloric acid, in which the sulfo-benzene-stearic acid is insoluble. The sulfo-fatty acids (not combined with benzene) originally present in the mixture had been decomposed by the heating into sulfuric acid and fatty matters. This they readily do when they have been prepared at low temperatures. The oily layer is then washed a number of times with petroleum ether, (commercial benzin or gasolin,) which dissolves the fatty matters and the benzene, leaving the compound pure, except for small quantities of water and hydrochloric acid, and these can be easily removed by drying at 100° centigrade. This compound has the following formula:

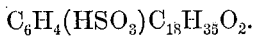

In place of the benzene naphthalene and phenol have been employed and compounds obtained which in physical properties are almost identical with that obtained from benzene. At present I prefer the naphthalene compound for my uses.

This new sulfo-fatty-aromatic compound has the following formula:

A general formula for this entire series of new compounds would be $R(HSO_3)C_{18}H_{35}O_2$, in which R represents the aromatic radical.

For commercial purposes it is not necessary to purify the new compound as described, one washing with water being generally sufficient.

These compounds possess the characteristics of sulfonic acids. On fusing with caustic potash potassium sulfite is obtained. They are dibasic acids, due to the acid hydrogen of the sulfonic and of the fatty radical. In physical properties these compounds resemble much more the sulfo-fatty acids than the aromatic sulfonic acids. They are amorphous compounds, soluble in water, but insoluble in solutions of acids or salts. They differ from the simple sulfo-fatty acids in being exceedingly stable, not decomposed by boiling with water or acid solution. This not only renders them more valuable as commercial articles, but extremely useful for laboratory purposes.

One of the chief uses of this reagent I have discovered to be in the decomposition of fats or oils into glycerine and fatty acids, carrying out the process invented by me and claimed in Letters Patent of the United States No. 601,603, granted me March 29, 1898, and using my new acid in place of the sulfo-fatty acids in that process. This sulfo-fatty-aromatic compound acts in the same way as the sulfo-fatty acid, but produces a better result in proportion to its greater stability. I mix the neutral fats or oils with the sulfo-fatty-aromatic acid and add water and treat the mixture to heat until the decomposition takes place and the resultant products are separated. This materially cheapens the cost of the production of the glycerine, as the sulfo-fatty-aromatic acid produces the same result as the sulfo-fatty acid and can be much cheaper produced and more readily handled owing to its stability. There will be a series of these compounds corresponding to the members of the oleic-acid series and aromatic series, which are mixed together and treated with the sulfuric acid. These compounds have uniform physical characteristics, varying slightly only in stability, according to the particular aromatic body employed, the chemical formulæ varying, of course, only as the aromatic radical varies with the particular member of the aromatic series used.

It is evident that this sulfo-fatty-aromatic acid is capable of an extended use in the arts, and I believe it has never before been known or used.

Having described my invention, I claim—

1. A sulfo-fatty-aromatic acid, consisting of a combination of the sulfonic radical with the stearic radical and an aromatic radical, the said acid being a viscous, non-volatile oil, soluble in water and amorphous, which is stable in character and acting as a dibasic acid forming water-soluble salts with the alkali metals and insoluble salts with the other metals, substantially as described.

2. A sulfo-fatty-aromatic acid, consisting of a combination of the sulfonic radical with the stearic radical and one of the aromatic radicals, having the general formula,

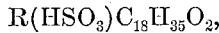

in which R, represents the particular aromatic radical, the said acid being a viscous, non-volatile oil, soluble in water and non-crystalline, which is stable in character and a dibasic acid forming water-soluble salts with the alkali metals and insoluble salts with the other metals, substantially as specified.

3. The process of producing a sulfo-fatty-aromatic compound, which consists in mixing a member of the fatty-acid series and a member of the aromatic series together and treating the mixture with sulfuric acid, substantially as specified.

4. The process of producing sulfo-fatty-aromatic compounds which consists in mixing any member of the fatty-acid series with a member of the aromatic series, treating the same with sulfuric acid, allowing the mixture to stand until the reaction has occurred, adding water to wash out the excess of sulfuric acid, and removing the resulting compound, substantially as specified.

5. The process of decomposing fats or oils into fatty acids and glycerine which consists in mixing fats or oils with a reagent of a sulfo-fatty-aromatic compound, adding water and treating the same to the action of heat until the decomposition is effected and the substances separated, substantially as specified.

In testimony whereof I have hereunto set my hand.

ERNST TWITCHELL.

Witnesses:
W. R. WOOD,
OLIVER B. KAISER.